May 18, 1943. R. D. SCHOENWETTER 2,319,636
OIL BURNER
Filed June 11, 1940 6 Sheets-Sheet 3

Inventor
Reinhold D. Schoenwetter
By Stevens and Davis
Attorneys

May 18, 1943.  R. D. SCHOENWETTER  2,319,636
OIL BURNER
Filed June 11, 1940  6 Sheets-Sheet 6

Inventor
Reinhold D. Schoenwetter
By Stevens & Davis
Attorneys

Patented May 18, 1943

2,319,636

UNITED STATES PATENT OFFICE 2,319,636

OIL BURNER

Reinhold D. Schoenwetter, Clarendon, Va., assignor to Swirling Heat, Inc., Rosslyn, Va., a corporation of Delaware Application June 11, 1940, Serial No. 339,962

7 Claims. (Cl. 158—28)

This invention relates generally to oil burners, and more particularly to that type of burner adapted for use in furnaces of household heating systems. The specific type of burner contemplated by this invention involves a modification of that disclosed in my copending application Serial No. 104,069, filed October 5, 1936, now Patent No. 2,204,451, of which case the present application is a continuation-in-part. Such burners include means for imparting to the combustion supporting air stream a violent swirling motion which causes the air to commingle with the atomized fuel and thereby quickly form a combustible mixture that will burn in complete suspension in such a manner that substantial carbon deposits on the elements of the heating unit are avoided. Burners of the type to which this invention is directed also include means which will divide the air into streams which pass through a plurality of series of passageways, one of said series causing the air to be directed tangentially against the fuel atomizing nozzle.

Burners manufactured in accordance with the teachings of my said prior application have been found to be very satisfactory, and the basic principles of such burners are utilized in the preferred embodiments of the present invention.

Normally, oil burners sold in industry today are assembled, tested and adjusted at a central plant without regard to conditions under which they are to operate. In practical installation, hardly any two oil burners are installed to operate under substantially identical conditions. The efficiency of burners requiring the construction of a refractory element in the furnace depends principally upon the size and design of the refractory, capable of causing proper commingling of oil and air. The size and design of refractories differ according to size and type of boilers; and the refractory installed with many burners is not designed as a part of the burner but is constructed by an "installation" man with the result that many burners are installed in a manner to seriously reduce the efficiency thereof.

Deflectors for causing the air to commingle with the atomized fuel have come into wide use, but the provision of an auxiliary deflector which will cooperate with the primary deflector has not proved entirely successful; especially since they do not provide for the cooling of the atomizing nozzle. These difficulties have been substantially overcome by the novel concept of burner design disclosed in my said application.

I have now found that the burners of my prior application may be improved in several important respects by utilization of principles hereinafter discussed. It is desirable that combustion of the fuel oil supplied by the atomizing nozzle be initiated as soon as possible after oil is supplied to said nozzle under pressure and thereby sprayed into the combustion zone. I have found that early and rapid ignition is achieved by placing the ignition electrodes within the burner head proper and in the neighborhood of the atomizing nozzle. Preferably said electrodes are so positioned that the ignition spark occurs in a region of combustible oil and air mixtures adjacent the nozzle, which result is advantageously obtained by placing the ignition electrodes within a passageway for admission of combustion supporting air with the sparking tips thereof in the region of mixture of such air with atomized oil.

The provision of rigidly fixed ignition means within the burner head requires that the parts of the burner shall always be in a predetermined relation. I have found, as noted in my prior application, that inequalities in the flame due to characteristics of the atomizing nozzle, may be compensated to a large extent by adjustment of the burner head. If both nozzle and head were perfect in every detail, the flame would be perfectly symmetrical; but since very minor imperfections in both nozzle and head do occur, I have found it advantageous to compensate for unsymmetrical sprays from the nozzle by rotation of the upper portion of the head until the flame assumes the most desirable characteristics.

It is further contemplated that the characteristics of the flame shall be improved by constructing the upper portion of the burner head, which aids in shaping the flame, of a refractory material having a fairly low heat conductivity. This modification results in transmission of very little heat to the body of the combustion head and tends to maintain the latter in a cool condition. Preferably the refractory upper portion is vertically spaced from the said body whereby a flow of air through the space thereby provided tends to further cool said body.

Other objects and advantages of the invention will appear from the following detailed description when considered in connection with the accompanying drawings, wherein.

Figure 1:
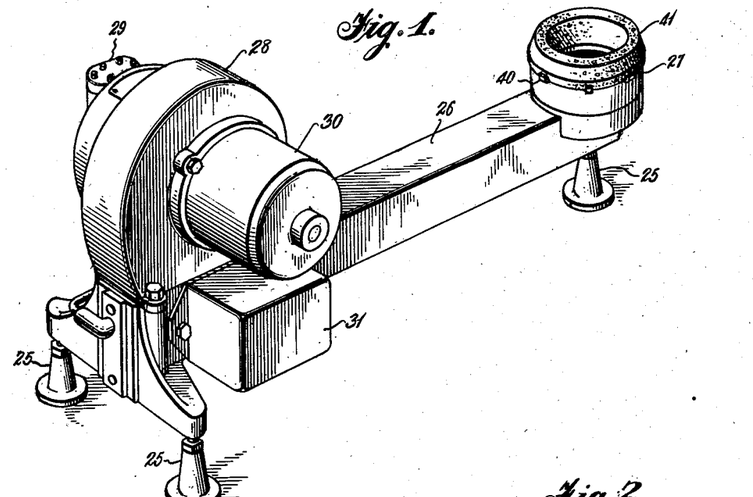
Figure 1 is a perspective view of a burner assembly embodying the principles of this invention.
Figure 2:
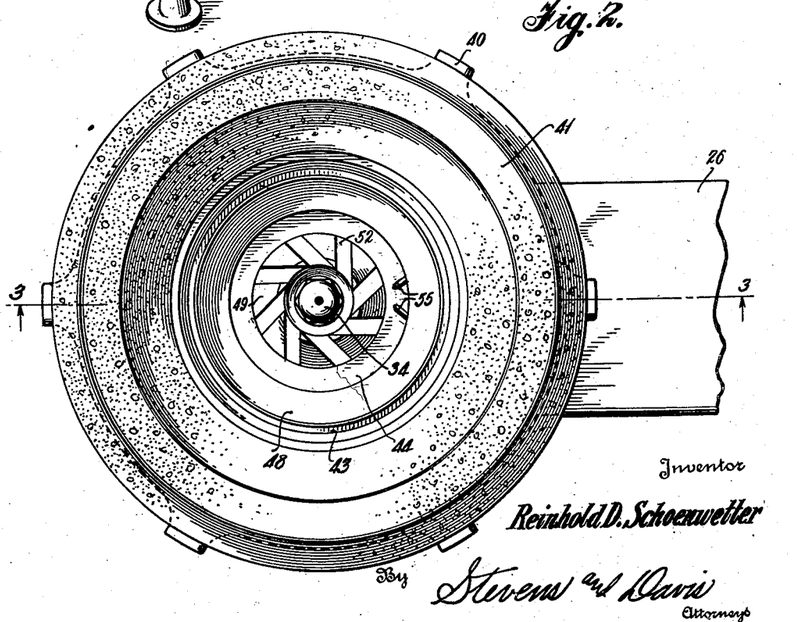
Figure 2 is a fragmentary top plan view of the assembly shown in Figure 1 specifically illustrating the burner head and blower tube in operative relation.

Referring specifically to Figure 1, the burner assembly is supported upon adjustable legs 25. The air tube 26 and burner head 27 are adapted to enter the combustion chamber of a conventional heating unit. The manner in which the assembly is positioned within said combustion chamber is fully discussed in my said prior application and those skilled in the art are referred to that case for a discussion of this matter. Air and oil are supplied to the burner head 27 by an air pump 28 and an oil pump 29 mounted upon the shaft of a prime mover 30. The air passes through said tube 26 while the oil is conducted to the head by means of a suitable conduit 32 within said tube. Electrical energy to energize the ignition means is supplied from transformer 31 through the medium of suitable bus bars 54 disposed within said air tube 26. Pump 29 discharges the fuel at a predetermined pressure through pressure-controlling valves (not shown) into conduit 32 which communicates with a strainer chamber 33 from which oil is conducted to an atomizing nozzle 34. The strainer chamber carries a fine mesh strainer adapted to cooperate with a strainer adjacent the pump to free the oil fed to the atomizing nozzle 34 from extraneous matter which would tend to clog the orifices therein. Guide members 35 are provided in the tube for positioning the conduit 32 and elements affixed thereto with respect to the other portions of the device in assembling the burner.

The fuel oil is discharged under pressure from said orifice in the form of a jet which, if unmolested, would be substantially conical in shape and of relatively equal density throughout. This however is not the case, for air supplied by the air pump or blower 28 through the air tube 26 is divided and deflected by deflector means in such a manner that a swirling motion will be imparted to it.

The outer casing for the burner head is constructed in two parts, the bottom part 36 being in the form of an upturned elbow that is secured to or integral with the air blast tube in the manner shown, flared and provided with a vertical cylindrical wall on which rests the upper portion 37 of the burner head casing. The upper portion of the burner head casing is so formed as to have a depending cylindrical wall which rests upon the vertical wall of the up-turned elbow 36. The upper portion 37 of the burner head casing is further provided with an inwardly extending annular flange 38, projections 39 and lugs 40 which support and position an annular refractory member 41 cooperating with the deflector plate to form a bowl-shaped space above the atomizing nozzle 34. The refractory member 41 is supported in spaced relation to the flange 38 by the projections 39, which are preferably three in number to provide adequate support for the refractory member in spaced relation to the flange with a minimum of conduction between said member and the flange. The refractory member 41 is preferably provided with reinforcing rings 42 formed of iron or any other suitable material.

Figure 6:
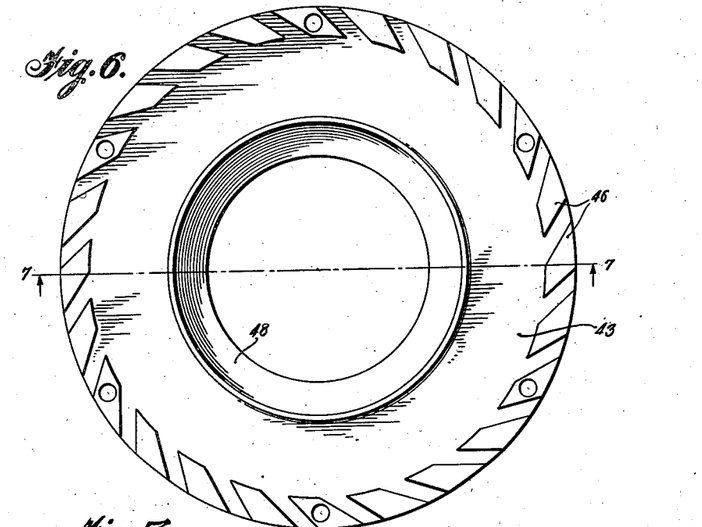
Figure 6 is a top plan view of the upper swirl producing plate.
Figure 7:
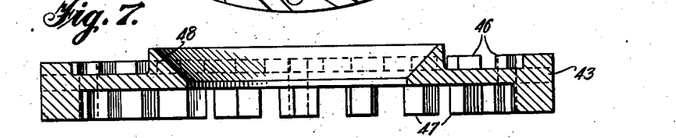
Figure 7 is a vertical section therethrough on line 7—7 of Figure 6.
Figure 8:
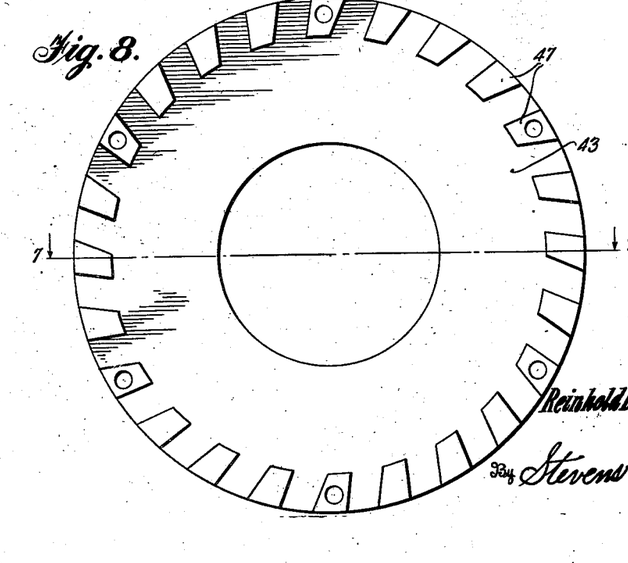
Figure 8 is a bottom plan view of said upper swirl producing plate.
Figure 9:
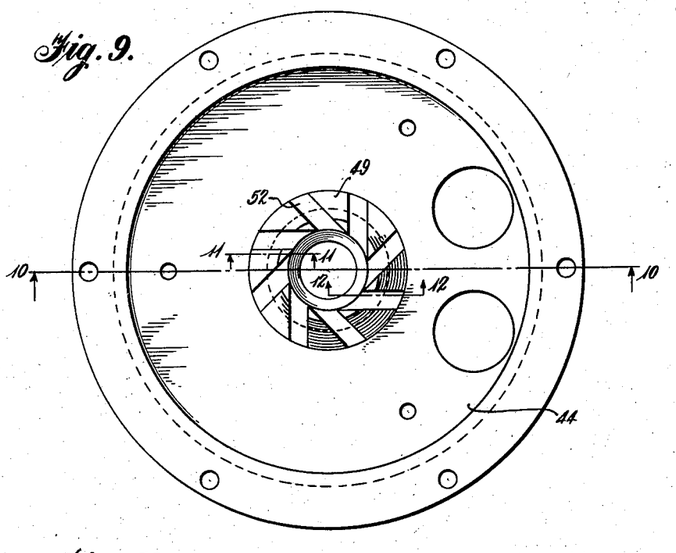
Figure 9 is a plan view of the lower swirl producing plate.
Figure 10:
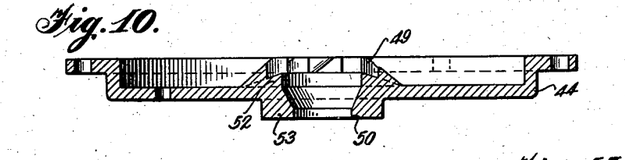
Figure 10 is a vertical section therethrough on line 10—10 of Figure 9.
Figure 11:
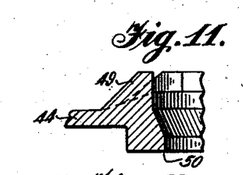
Figures 11 and 12 are detail sectional views on lines 11—11 and 12—12 of Figure 9, respectively.
Figure 12:
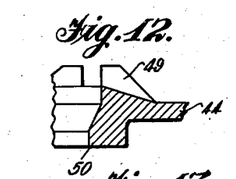

Upper swirl producing plate 43 and lower swirl producing plate 44 are secured to the under side of the flange 38 as by bolts 45. Passages for combustion supporting air are provided between flange 38 and upper swirl producing plate 43 and between upper swirl producing plate 43 and lower swirl producing plate 44 by tangentially disposed openings. It may be explained here that the said openings are tangential to a circle about the axis of the head, which axis is substantially coincident with that of the nozzle. In the interest of simplicity, the term "tangential" is used in this specification and in the claims to designate tangential relationship to any circle about the said axes. Preferably these openings are in the form of grooves in both the upper and lower surfaces of upper swirl producing plate 43 as is clearly shown in Figures 6, 7 and 8. According to this preferred embodiment there are provided a plurality of tangential openings defined by projections 46 about the periphery of the upper surface of plate 43 and projections 47 about the periphery of the lower surface of plate 43. The openings so defined are generally tangential to the axis of said plate and are thereby adapted to impart a swirling motion to air passing therethrough and thereby cause swirling of the combustible mixture of said air with oil sprayed through a circular opening in said plate by the atomizing nozzle 34. It will be noted that the said circular opening is associated with a circular flange 48 on the upper surface of plate 43 which is shaped to define an opening of generally conical form and thereby cooperate with the refractory member 41 to provide a bowl-shaped combustion zone.

Lower swirl producing plate 44 is provided with a central orifice, the shoulders 50 formed thereby being adapted to rest upon the upper portion of the strainer chamber 33. The nozzle and oil supply assembly comprising conduit 32, strainer chamber 33 and atomizing nozzle 34, are supported entirely by the end of the tube 32 adjacent the pump and blower assembly. This portion of the assembly is so arranged that the resiliency of the conduit 32 tends to urge the nozzle 34 above its normal position when the burner head is in place. This expedient insures that the shoulder 50 shall rest snugly upon the upper surface of the strainer chamber 33. A plurality of tangential upwardly-sloping grooves are defined about the central orifice in lower plate 44 by means of projections 49 in a conical boss 52, whereby a portion of the air supplied between swirl producing plates 43 and 44 is directed against the atomizing nozzle 34 in a swirling and rising stream which maintains the nozzle cool and prevents the deposition of oil or carbon thereon. The lower surface of the said grooves are at a lesser slope than the exterior of said conical boss 52 in order to impart a rising motion to the air passing therethrough. A circular boss 53 on the under side of plate 44 is formed to provide a flat circular surface facing downwardly and bounded by a sharp corner from which oil will drop, to thereby prevent spreading of such small amounts of oil as may fall from the nozzle and escape by shoulder 50.

It will be noted that the air supplied between plates 43 and 44 constitutes the greater proportion of the total air supplied for combustion purposes. Although this type of construction is preferred, the invention contemplates modifications wherein the greater proportion of the air is supplied between the flange 38 and the plate 43. In order to distinguish this preferred embodiment, the words "principal" and "auxiliary" as applied to air streams are here used to denote greater and lesser proportions of air, respectively; while the words "primary" and "secondary" designate the order in which the air streams are supplied with respect to the flow of oil as sprayed from the atomizing nozzle 34. The deflector means and air streams supplied thereby may also be referred to as "upper" and "lower," thus designating their relative positions in burners having a vertical nozzle and an upwardly extending flame.

Figure 13:
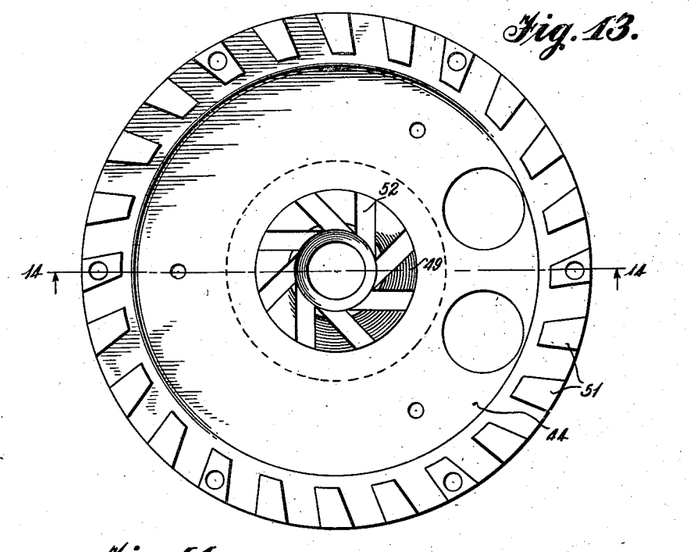
Figure 13 is a plan view of a modified form of the lower swirl producing plate.
Figures 14, 21, 22:
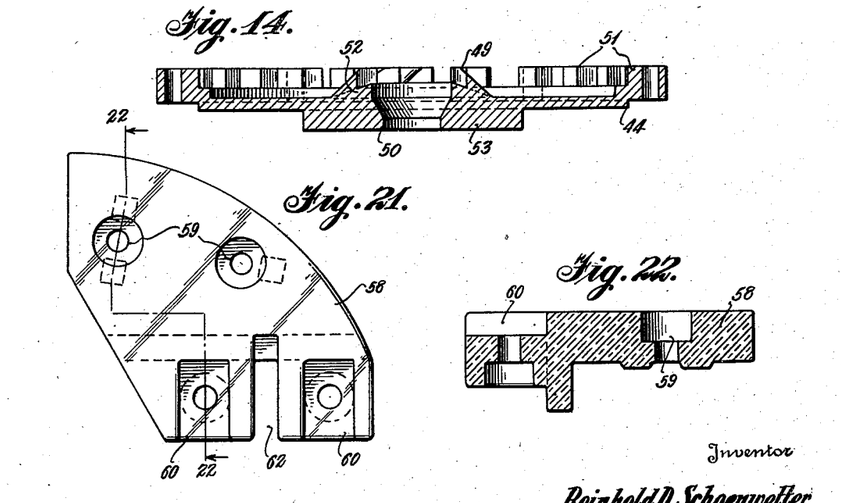
Figure 14 is a vertical section thereof on line 14—14 of Figure 13.
Figure 21 is a plan view of the plate employed to maintain in place the contacts connecting the electrode mountings with bus bars through which current is provided for ignition.
Figure 22 is a section thereof on line 22—22 of Figure 21.
Figure 15:
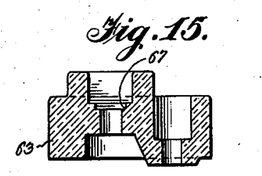
Figures 15 to 20 are sectional details of the insulator structure, said views being taken on the lines indicated on Figure 5.
Figure 16:
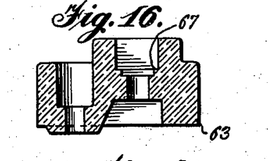
Figure 17:
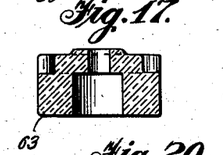
Figure 18:
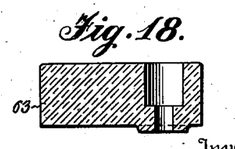
Figure 19:
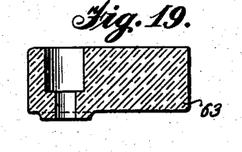
Figure 20:
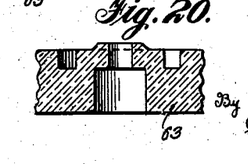

In certain cases, where large heating capacity is desirable, larger amounts of air are supplied to the combustion zone by the air deflector means and a larger nozzle is used. The increase in air supply is preferably obtained by enlarging the openings for influx of principal air between the swirl producing plates 43 and 44. I have accomplished this result to good advantage by utilizing the modified lower swirl producing plate 44 shown in Figures 13 and 14. In accordance with this embodiment, the lower swirl producing plate 44 is formed with a plurality of projections 51 about the periphery thereof, which projections define tangential channels which are, in effect, enlargements of the openings on the lower side of upper swirl producing plate 43. As here illustrated, the entire burner head assembly is so designed that the two forms of lower swirl producing plate 44 are interchangeable. Thus a burner head assembly may be readily converted from a smaller to a larger capacity, or vice versa, by changing the lower swirl producing plate 44 and the nozzle 34.

As noted above, the energy to energize electrodes 55 is transmitted from the transformer 31 through the bus bars 54 disposed within air tube 26. It is desirable that the burner head be capable of rotation for adjustment of the flame and that the burner head also be capable of ready removal for purposes of inspection, adjustment and such infrequent cleaning as may be necessary. It will be at once apparent that permanent connections between the bus bars 54 and electrodes 55 will defeat these objects and I therefore provide non-permanent contact elements which will permit rotation or removal of the head without the necessity for special steps to disconnect the source of current supply from the electrodes 55. Preferably this result is obtained by spring contacts 56 in conducting relationship to the bus bars 54, which contacts bear upon conducting rings 57 indirectly secured to the lower surface of the burner head assembly.

An insulating plate 58 is secured to a horizontal portion of the air tube 26 connecting said tube to the vertical wall 36 by means of bolts passing through counter-bored openings 59 in the plate 58. The spring contacts 56 are fixed in recesses 60 by bolts which are in electrical conducting relationship with snap connectors 61 adapted to engage suitable members on the ends of the bus bars 54. In accordance with approved practice, the plate 58 is preferably formed of porcelain and the recesses 60 are separated by an air gap 62 in addition to the porcelain walls therebetween.

Figure 3:
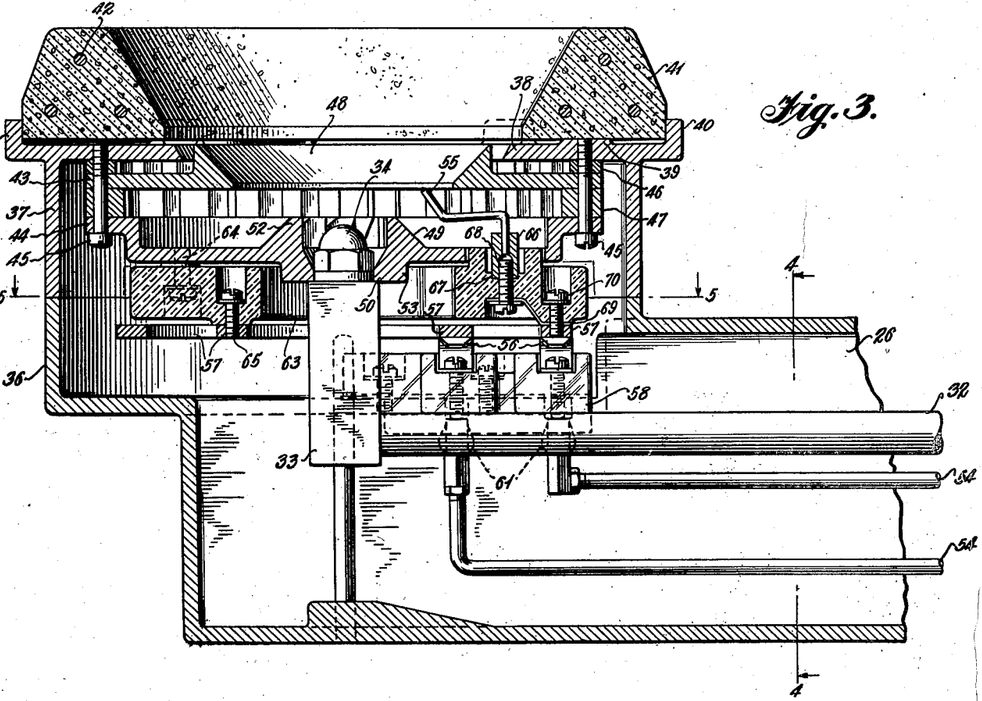
Figure 3 is a vertical section on line 3—3 of Figure 2 illustrating the assembled relation of the parts of the burner head and the relation of other elements of the complete burner thereto.
Figure 4:
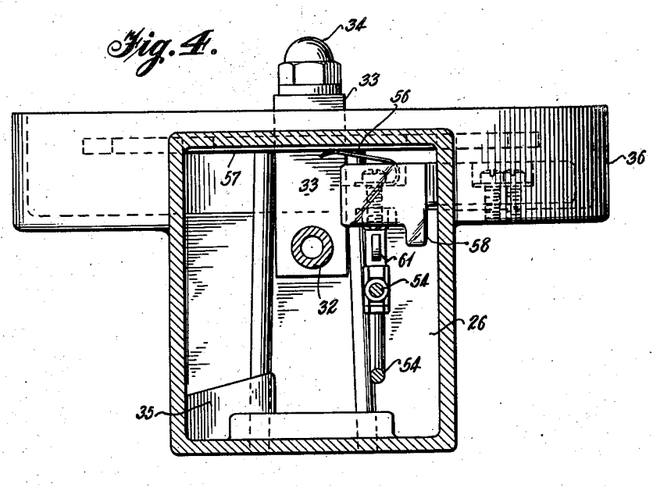
Figure 4 is a vertical section on line 4—4 of Figure 3 showing the relation of parts of the burner assembly with the burner head removed.
Figure 5:
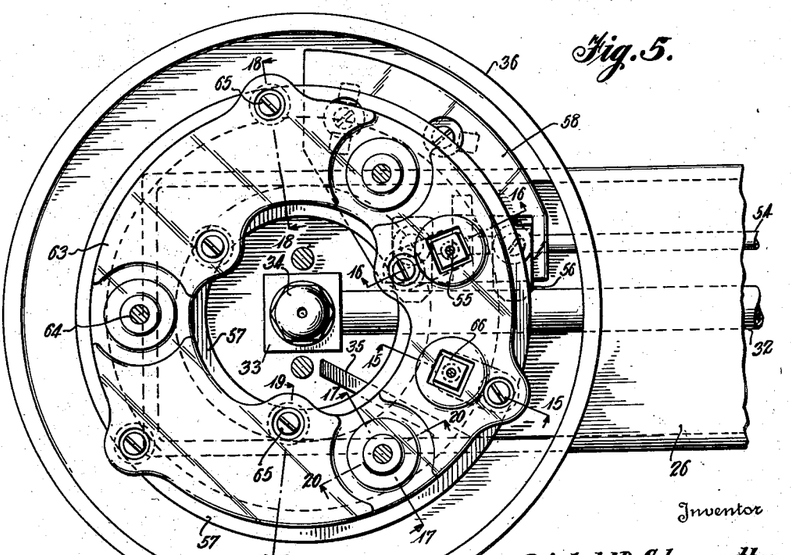
Figure 5 is a horizontal section on line 5—5 of Figure 3 illustrating the connection for the ignition electrodes.

The conducting rings 57 are retained in position below the lower swirl producing plate 44 by being bolted to a porcelain insulating ring 63 which is in turn bolted to the plate 44. It will be understood that bolts contacting the rings 57 must be so spaced in the ring 63 as to be insulated from each other and from the bolts contacting the plate 44. As will be seen from Figures 3 and 5 and the detailed sections in Figures 15 to 20, the insulating ring 63 includes recessed openings for bolts 64 engaging threads in the plate 44. Bolts 65 pass through recessed openings in the insulating plate 63 spaced from the recessed openings for bolts 64 to engage threads in the conducting rings 57. Each of the electrodes 55 is mounted in square block 66 adapted to rest upon a shoulder 67 in a recessed opening in said insulating ring 63. A bolt 68 engages threads in the block 66 and makes contact with a conducting strip 69 on the under side of the insulating ring 63 in the manner shown. The strip 69 is interposed between a conducting ring 57 and the insulator 63 where it is retained in place by the pressure exerted through bolt 70.

During operation of the burner, air passes through the passages between plates 43 and 44, circles about the axis of the combustion head and progresses to the central opening of plate 43. A portion of said air passes between the projections 49 on plate 44 and is thereby directed to and about the nozzle 34; thereby cooling said nozzle and lifting any suspended matter from thereabout. The upward slope of the bottom of the grooves between projections 49 gives the said portion of air a rising motion and the same therefore tends to entrain oil droplets and to move rapidly in a continuous stream in contact with the nozzle, whereby maximum cooling of the nozzle is effected. After the swirling principal air mingled with atomized oil passes through the opening in plate 43 it progresses in rising and expanding circles in the shape of an inverted cone, which would tend to be relatively dense throughout if control were not exercised by auxiliary air supplied between flange 38 and upper swirl producing plate 43. A rapid swirling motion is imparted to the auxiliary air by the projections 47 and is then directed upwardly by striking the outer surface of circular flange 48. The tendency of the auxiliary air as supplied to the combustion zone is to continue in straight lines (outwardly); but is confined by the inner surface of the refractory member 41. The auxiliary air therefore follows the surface of member 41, exerting a partial vacuum effect which broadens the cone of mingled air and oil in the combustion zone and thereby renders said cone hollow. The suction effect of the auxiliary air also draws relatively cool air between the flange 38 and the refractory member 41. This air tends to maintain the flange 38 in a fairly cool condition by removal of the small amounts of heat conducted through the bosses 39, and the effective life of the burner is thereby increased. The refractory member 41 is preferably removable in order that the same may be readily replaced if necessary.

It will be noted that all air passing through the principal and auxiliary supply means is derived from a single annular channel which tends to distribute the air in an equalizing manner and thereby stabilize operation of the burner.

It will be understood that the above disclosure of a specific embodiment of the invention is illustrative only and it is not intended that the invention shall be limited thereto.

I claim:

1. In an oil burner including an atomizing nozzle, wall means substantially concentric with the axis of said nozzle defining a substantially circular burner head, flame shaping means within said wall means defining a generally conical combustion zone opening in the direction of discharge from said nozzle and at least one means to admit air to said combustion zone in a region supplied by the discharge of said nozzle; ignition means comprising a pair of electrodes extending into said combustion zone, a pair of electrical conducting means substantially concentric with the axis of said nozzle disposed within said head on the side of said discharge end of said nozzle remote from said combustion zone and each electrically connected to one of said electrodes, and a means for establishing electrical connection between each of said electrical conducting means and a source of electrical energy.

2. In an oil burner including an atomizing nozzle, wall means substantially concentric with the axis of said nozzle defining a substantially circular burner head, flame shaping means within said wall means defining a generally conical combustion zone opening in the direction of discharge from said nozzle and at least one means to admit air to said combustion zone in a region supplied by the discharge of said nozzle; ignition means comprising a pair of electrodes extending into said combustion zone, a pair of electrical conducting means substantially concentric with the axis of said nozzle disposed within said head on the side of said discharge end of said nozzle remote from said combustion zone and each electrically connected to one of said electrodes, a resilient contact means in contact with each of said electrical conducting means, and means for supplying electrical energy to each of said resilient contact means.

3. An oil burner including a vertical atomizing nozzle, an air supply tube substantially concentric with the axis of said nozzle, a pair of spaced spring contact members in said air supply tube, means for supplying electrical energy to said spring contact members, means for supplying fuel oil to said nozzle, means for supplying air to said air supply tube and a removable head comprising an outer circular wall adapted to rest upon and constitute an extension of said air supply tube, a ring of refractory material, means to support said ring in spaced relation to said wall, an upper swirl producing plate secured below said ring, said upper swirl producing plate having a central orifice shaped to cooperate with said ring to define a substantially bowl-shaped combustion zone, means intermediate said upper swirl producing plate and said ring defining a plurality of air passages communicating with said air supply tube and generally tangential to a circle about said nozzle axis, a lower swirl producing plate secured below said upper swirl producing plate, means between said swirl producing plates defining a plurality of air passages generally tangential to a circle about the axis of said nozzle, said lower swirl producing plate having a central orifice adapted to receive the discharge end of said nozzle, an insulating ring secured to the under side of said lower swirl producing plate, a pair of electrical conducting rings concentric with said nozzle axis secured to the lower side of said insulating ring and each adapted to be in contact with one of said spring contact members, and a pair of ignition electrodes extending to said combustion zone and each connected to one of said conducting rings.

4. An oil burner including a vertical atomizing nozzle, an air supply tube substantially concentric with the axis of said nozzle, a pair of spaced spring contact members in said air supply tube, means for supplying electrical energy to said spring contact members, means for supplying fuel oil to said nozzle, means for supplying air to said supply tube and a removable head comprising an outer circular wall adapted to rest upon and constitute an extension of said air supply tube, a ring of refractory material, means to support said ring in spaced relation to said wall, air supply means defining a plurality of air passages communicating with said air supply tube and generally tangential to a circle about said nozzle axis, means adjacent said air supply means shaped to cooperate with said ring to define a substantially bowl-shaped combustion zone, an insulating ring positioned below said air supply means, a pair of electrical conducting rings concentric with said nozzle axis secured to the lower side of said insulating ring and each adapted to be in contact with one of said spring contact members, and a pair of ignition electrodes extending to said combustion zone and each connected to one of said conducting rings.

5. An oil burner including a vertical atomizing nozzle, an air supply tube substantially concentric with the axis of said nozzle, a pair of spaced spring contact members in said air supply tube, means for supplying electrical energy to said spring contact members, means for supplying fuel oil to said nozzle, means for supplying air to said air supply tube and a removable head comprising an outer circular wall adapted to rest upon and constitute an extension of said air supply tube, an inwardly extending flange on the upper end of said wall, an upper swirl producing plate secured below said flange, said upper swirl producing plate having a central orifice shaped to define in part a substantially bowl-shaped combustion zone, means between said upper swirl producing plate and said flange defining a plurality of air passages generally tangential to a circle about said nozzle axis, a lower swirl producing plate secured below said upper swirl producing plate, means between said swirl producing plates defining a plurality of air passages generally tangential to a circle about the axis of said nozzle, said lower swirl producing plate having a central orifice adapted to receive the discharge end of said nozzle, an insulating ring secured to the under side of said lower swirl producing plate, a pair of electrical conducting rings concentric with said nozzle axis secured to the lower side of said insulating ring and each adapted to be in contact with one of said spring contact members, and a pair of ignition electrodes extending to said combustion zone and each connected to one of said conducting rings.

6. An oil burner including a vertical atomizing nozzle, an air supply tube substantially concentric with the axis of said nozzle, means for supplying fuel oil to said nozzle, means for supplying air to said air supply tube and a removable head comprising an outer circular wall adapted to rest upon and constitute an extension of said air supply tube, an inwardly extending flange on the upper end of said wall, air supply means below said flange defining a plurality of air passages communicating with said air supply tube and generally tangential to a circle about said nozzle axis, means adjacent said air supply means shaped to define in part a substantially bowl-shaped combustion zone, and a conical boss adjacent said nozzle and substantially concentric with the axis thereof having upwardly sloping grooves defined in the conical surface of said boss, the bottoms of said grooves being sloped upwardly toward the inner portion of said boss whereby a rising motion is imparted to the air passing therethrough.

7. An oil burner including a vertical atomizing nozzle, an air supply tube substantially concentric with the axis of said nozzle, means for supplying fuel oil to said nozzle, means for supplying air to said air supply tube and a removable head comprising an outer circular wall adapted to rest upon and constitute an extension of said air supply tube, an inwardly extending flange on the upper end of said wall, air supply means below said flange defining a plurality of air passages communicating with said air supply tube and generally tangential to a circle about said nozzle axis, means adjacent said air supply means shaped to define in part a substantially bowl-shaped combustion zone and a refractory ring above said flange in spaced relation thereto, the inner surface of said ring being shaped to aid in defining said bowl-shaped combustion zone, whereby the swirling motion of air from said air passages will tend to draw air between said flange and said ring, thereby cooling said flange.

REINHOLD D. SCHOENWETTER.